United States Patent
Mamba et al.

(10) Patent No.: US 8,199,127 B2
(45) Date of Patent: Jun. 12, 2012

(54) DISPLAY PANEL

(75) Inventors: Norio Mamba, Kawasaki (JP); Tsutomu Furuhashi, Yokohama (JP); Hideo Sato, Hitachi (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 624 days.

(21) Appl. No.: 12/353,296

(22) Filed: Jan. 14, 2009

(65) Prior Publication Data

US 2009/0213090 A1 Aug. 27, 2009

(30) Foreign Application Priority Data

Feb. 27, 2008 (JP) .................. 2008-045538

(51) Int. Cl.
*G06F 3/045* (2006.01)
(52) U.S. Cl. ............... 345/174; 345/173; 178/18.06
(58) Field of Classification Search ............... 178/18.06
See application file for complete search history.

(56) References Cited

U.S. PATENT DOCUMENTS

| | | | |
|---|---|---|---|
| 6,147,680 A | 11/2000 | Tareev | |
| 7,030,860 B1 | 4/2006 | Hsu et al. | |
| 7,663,607 B2 | 2/2010 | Hotelling et al. | |
| 2003/0052867 A1 | 3/2003 | Shigetaka | |
| 2004/0239650 A1 | 12/2004 | Mackey | |
| 2005/0030048 A1 | 2/2005 | Bolender et al. | |
| 2006/0066581 A1 | 3/2006 | Lyon et al. | |
| 2008/0309633 A1* | 12/2008 | Hotelling et al. | 345/173 |
| 2009/0085885 A1* | 4/2009 | Wu et al. | 345/173 |
| 2010/0045625 A1* | 2/2010 | Yang et al. | 345/173 |

FOREIGN PATENT DOCUMENTS

| | | |
|---|---|---|
| CN | 101131492 | 2/2008 |
| JP | 2003-511799 | 3/2003 |
| KR | 10-2007-0011450 | 1/2007 |
| WO | WO 01/27868 A1 | 4/2002 |
| WO | WO 2005/114369 | 12/2005 |
| WO | WO 2007/115032 | 10/2007 |

* cited by examiner

*Primary Examiner* — Lixi C Simpson
(74) *Attorney, Agent, or Firm* — Antonelli, Terry, Stout & Kraus, LLP.

(57) ABSTRACT

A display panel is provided having a capacitive touch panel over a display region, wherein the capacitive touch panel comprises a plurality of X electrodes and a plurality of Y electrodes formed with an insulating layer there between and in a manner to cross each other, each of the X electrodes and the Y electrodes is formed such that a pad portion and a narrow line portion are alternately placed in a direction of extension, and when viewed from top, the pad portion of the X electrode and the pad portion of the Y electrode are placed to not overlap each other and a dummy electrode which is in a floating relationship with the X electrode and the Y electrode is formed between the pad portion of the X electrode and the pad portion of the Y electrode.

12 Claims, 16 Drawing Sheets

FIG.15    (Prior Art)

DISPLAY PANEL

CROSS-REFERENCE TO RELATED APPLICATIONS

The present application claims priority from Japanese application JP 2008-045538 filed on Feb. 27, 2008, the content of which is hereby incorporated by reference into this application.

BACKGROUND OF THE INVENTION

1. Field of the Invention

The present invention relates to a display panel.

2. Description of the Related Art

In a display panel having a capacitive touch panel over a display region, the display region can be viewed through the capacitive touch panel (hereinafter simply referred to as "touch panel"), and a predetermined location on the display region can be designated through, for example, contact of a finger or the like on the touch panel.

In the touch panel, a plurality of X electrodes and a plurality of Y electrodes are formed with an insulating film therebetween in a shape crossing each other, and a change of a capacitance due to contact of a finger can be detected. That is, the touch panel is configured to detect a difference between a capacitance when no finger is in contact (for example, a capacitance Cx of X electrode) and a capacitance when a finger having a capacitance Cf is in contact (Cx+Cf).

Here, when a detection circuit which uses a low current source or the like is used for detection of the change in the capacitance, the signal corresponding to the difference is approximately proportional to $Cf/\{Cx\times(Cf+CX)\}$. A position (coordinate) of the contact position is calculated through a center-of-gravity process or the like based on this signal, and information is reflected on the display panel.

A touch panel having such a structure is disclosed in, for example, Japanese Application of Unexamined PCT Patent Application No. 2003-511799.

As shown in FIG. 15 which schematically shows a structure of the touch panel, an X electrode XP comprises a plurality of electrodes which extend along a y direction in FIG. 15 and which are aligned along an x direction, and a Y electrode YP comprises a plurality of electrodes which extend along the x direction and which are aligned along the y direction.

The X electrode XP is formed such that a wide-width portion (pad portion) having a rhombus shape and a narrow-width portion (narrow line portion) are alternately provided along the direction of extension of the X electrode XP. Similarly, the Y electrode YP is formed such that a wide-width portion (pad portion) having a rhombus shape and a narrow-width portion (narrow line portion) are alternately provided along the direction of extension of the Y electrode YP.

The pad portion of the X electrode XP and the pad portion of the Y electrode YP are placed so that they do not overlap each other, and the crossing section between the X electrode XP and the Y electrode YP is located at a position of the narrow line portion.

As shown in FIG. 16 which is a cross sectional view along the XVI-XVI line of FIG. 15, the X electrode XP and the Y electrode YP are formed over a substrate TSB with an insulating layer INS therebetween. In FIG. 16, reference sign GRD represents a protection layer for protecting the electrode and reference sign SLD represents a shield layer for blocking noise.

In order to improve the detection capability of the touch panel, it is required that a space α of a certain degree (refer to FIG. 16) be provided between the pad portion of the X electrode XP and the pad portion of the Y electrode YP, when viewed from the top.

In this case, if the space α is widened, there is a disadvantage that, because of a difference in transmittance of light between the portion of the space and the portion where the electrode is formed or because of a difference in a reflective characteristic caused by a difference in the vertical structure as shown in FIG. 16, the pattern of the X electrode XP or the pattern of the Y electrode YP is viewed.

If, on the other hand, the space α is narrowed, and an overlap occurs between the X electrode XP and the Y electrode YP due to a deviation of a mask during manufacturing, the electrode capacitance (Cx or Cy) is significantly increased, and there is a disadvantage that the above-described detection signal proportional to $Cf/\{Cx\times(Cf+CX)\}$ becomes small. In addition, even when there is no overlap between the X electrode XP and the Y electrode YP, when the space α is significantly reduced, a fringe capacitance between the electrodes is increased, resulting in the disadvantage as described above, and degradation in the detection capability of the touch panel.

SUMMARY OF THE INVENTION

An advantage of the present invention is that a display panel is provided having a touch panel in which the viewing of the pattern of the electrodes can be reduced and the coordinate detection precision is improved.

According to various aspects of the present invention, there are provided:

(1) a display panel having, for example, a capacitive touch panel over a display region, wherein the capacitive touch panel comprises a plurality of X electrodes and a plurality of Y electrodes formed with an insulating layer therebetween and in a manner to cross each other, each of the X electrodes and the Y electrodes is formed such that a pad portion and a narrow line portion are alternately placed in a direction of extension, and, when viewed from top, the pad portion of the X electrode and the pad portion of the Y electrode are placed to not overlap each other and a dummy electrode which is in a floating relationship with the X electrode and the Y electrode is formed between the pad portion of the X electrode and the pad portion of the Y electrode;

(2) the display panel according to, for example, (1), wherein the dummy electrode between the pad portion of the X electrode and the pad portion of the Y electrode comprises a plurality of electrodes which are aligned from the pad portion of the X electrode to the pad portion of the Y electrode;

(3) the display panel according to, for example, (1) or (2), wherein the dummy electrode is formed in a same layer as the X electrode;

(4) the display panel according to, for example, (1) or (2), wherein the dummy electrode is formed in a same layer as the Y electrode;

(5) the display panel according to, for example, (2), wherein the plurality of dummy electrodes between the pad portion of the X electrode and the pad portion of the Y electrode comprise a dummy electrode formed in a same layer as the X electrode and a dummy electrode formed in a same layer as the Y electrode;

(6) the display panel according to, for example, (1), comprising a dummy electrode in a same layer as the X electrode and a dummy electrode in a same layer as the Y electrode, wherein, when viewed from top, the dummy electrode in the same layer as the X electrode and the dummy electrode in the same layer as the Y electrode overlap each other;

(7) the display panel according to, for example, any one of (1)-(6), wherein a dummy electrode placed overlapping the pad portion of the Y electrode is formed in a same layer as the X electrode and a dummy electrode placed overlapping the pad portion of the X electrode is formed in a same layer as the Y electrode;

(8) a display panel having, for example, a capacitive touch panel over a display region, wherein the capacitive touch panel comprises a plurality of X electrode and a plurality of Y electrodes formed with an insulating layer therebetween and in a manner to cross each other, each of the X electrodes and the Y electrodes is formed such that a pad portion and a narrow line portion are alternately placed in a direction of extension, and a dummy electrode which is in a floating relationship with the X electrode and the Y electrode is formed in a region of each of the pad portions of the X electrode and the Y electrode;

(9) the display panel according to, for example, (8), wherein when viewed from top, the pad portion of the X electrode and the pad portion of the Y electrode are placed to not overlap each other, and a dummy electrode which is in a floating relationship is formed between the pad portion of the X electrode and the pad portion of the Y electrode;

(10) the display panel according to, for example, (9), wherein the dummy electrode between the pad portion of the X electrode and the pad portion of the Y electrode comprises a plurality of electrodes which are aligned from the pad portion of the X electrode to the pad portion of the Y electrode;

(11) the display panel according to, for example, (9) or (10), wherein the dummy electrode is formed in a same layer as the X electrode;

(12) the display panel according to, for example, (9) or (10), wherein the dummy electrode is formed in a same layer as the Y electrode;

(13) the display panel according to, for example, (9), wherein the plurality of dummy electrodes between the pad portion of the X electrode and the pad portion of the Y electrode comprises a dummy electrode formed in a same layer as the X electrode and a dummy electrode formed in a same layer as the Y electrode;

(14) the display panel according to, for example, (9), comprising a dummy electrode in a same layer as the X electrode and a dummy electrode in a same layer as the Y electrode, wherein, when viewed from top, the dummy electrode in the same layer as the X electrode and the dummy electrode in the same layer as the Y electrode overlap each other; and

(15) the display panel according to, for example, any one of (8)-(14), wherein a dummy electrode placed overlapping the pad portion of the Y electrode is formed in a same layer as the X electrode and a dummy electrode placed overlapping the pad portion of the X electrode is formed in a same layer as the Y electrode.

The present invention is not limited to the above-described structures, and various modifications may be made within a scope and spirit of the present invention. Example configurations of the present invention other than those described above will become apparent from the description of the overall specification and drawings.

With the display panel having such a structure, it is possible to realize a display panel having a touch panel in which viewing of the pattern of the electrode can be reduced and the coordinate detection precision is improved.

Other advantages of the present invention will become apparent from the description of the overall specification.

BRIEF DESCRIPTION OF THE DRAWINGS

These and other features, objects and advantages of the present invention will become apparent from the following description when taken in conjunction with the accompanying drawings wherein.

DESCRIPTION OF THE EMBODIMENTS

Figure 1:
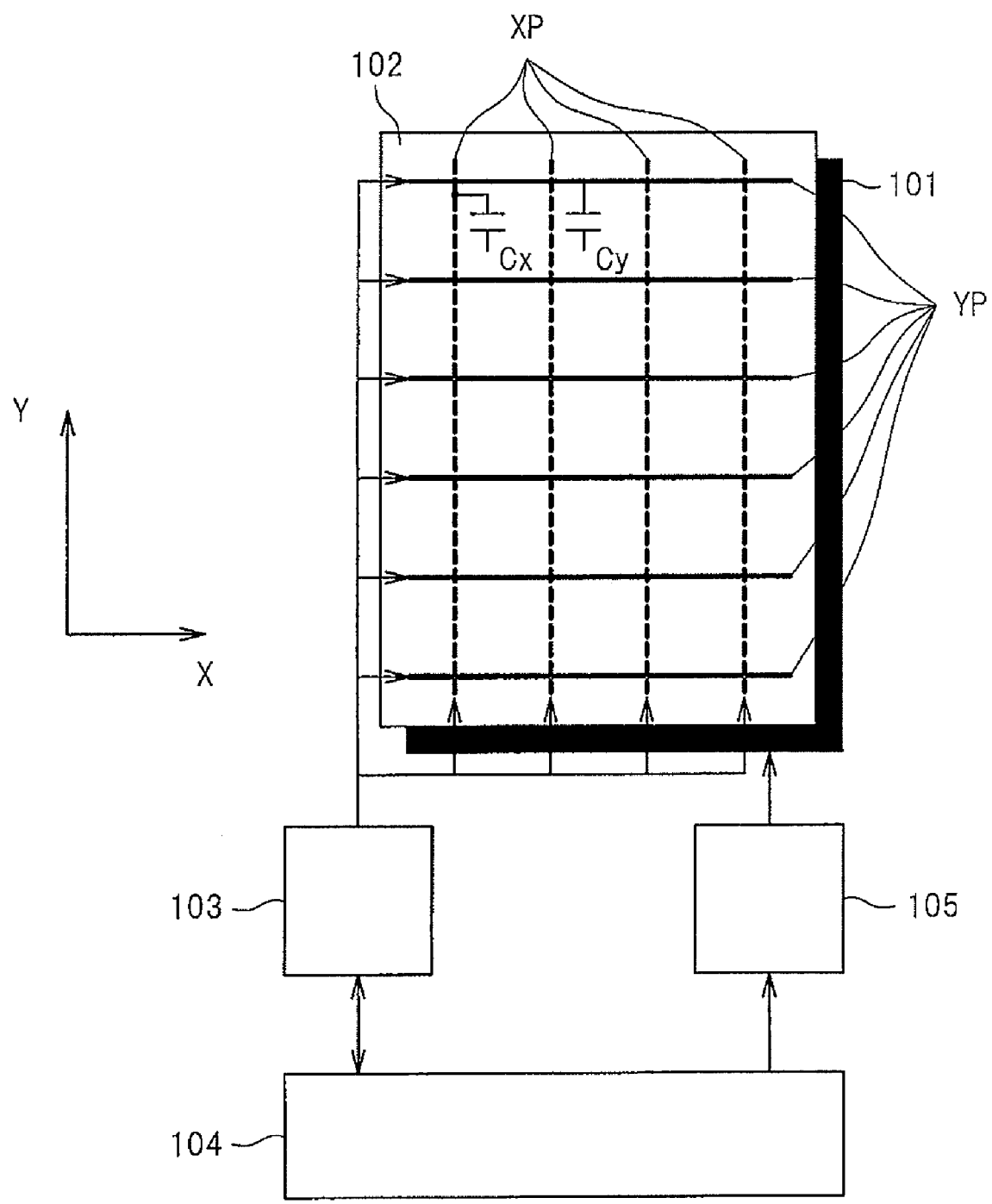
FIG. 1 is a structural diagram schematically showing a preferred embodiment of a display panel of the present invention.

Preferred embodiments of the present invention will now be described with reference to the drawings. In the drawings and the preferred embodiments, the same or similar constituting elements are assigned the same reference numerals and will not be repeatedly described. In the description and drawings, reference numeral 101 represents a display panel (display), reference numeral 102 represents a touch panel, reference numeral 103 represents a detection circuit, reference numeral 104 represents a system (CPU), reference numeral 105 represents a display controller, reference sign XP represents an X electrode, reference sign YP represents a Y electrode, reference signs XD and YD represent dummy electrodes, reference sign TSB represents a transparent substrate, reference sign INS represents an insulating layer, reference sign GRD represents a protection layer, and reference sign SLD represents a shield layer.

[First Preferred Embodiment]

FIG. 1 is a structural diagram showing a preferred embodiment of a display panel of the present invention, along with a touch panel and a driving circuit of the touch panel. A touch panel 102 is placed over a display region of a display panel (display) 101. The touch panel 102 comprises an X electrode XP and a Y electrode YP with an insulating film (not shown) therebetween. The X electrode XP comprises a plurality of electrodes which extend along a y direction in FIG. 1 and which are aligned along an x direction, and detects a coordinate in the x direction. The Y electrode YP comprises a plurality of electrodes which extend along the x direction and which are aligned along the y direction, and detects a coordinate in the y direction. The touch panel 102 is formed with a transparent member including the X electrode XP and the Y electrode YP so that the display panel 101 can be viewed through the touch panel 102. The X electrode XP and the Y electrode YP are connected to a detection circuit 103 which detects capacitances of the X electrode XP and the Y electrode YP. If the capacitances of the X electrode XP and the Y electrode YP when the finger of the operator, for example, is not in contact with the touch panel 102 are Cx and Cy, respectively, and the capacitance of the finger (amount of change of capacitance) is Cf, when the finger is in contact with the touch panel 102 (hereinafter also referred to as "contact"), the detection circuit 103 detects a capacitance of Cx+Cf or Cy+Cf. On the other hand, when the finger is not in contact with the touch screen 102 (hereinafter also referred to as "non-contact"), the detection circuit 103 detects the capacitances of Cx and Cy. In addition, the detection circuit 103 receives, as signal components of the X electrode XP and the Y electrode YP, a capacitance difference between contact and non-contact of the finger and calculates the coordinate of the location where the finger is in contact based on these signal components. The information of the coordinate is transferred to a system (CPU) 104, and, according to a process based on the input information, the information is reflected on the display panel 101 via the display controller 105.

Figure 2:
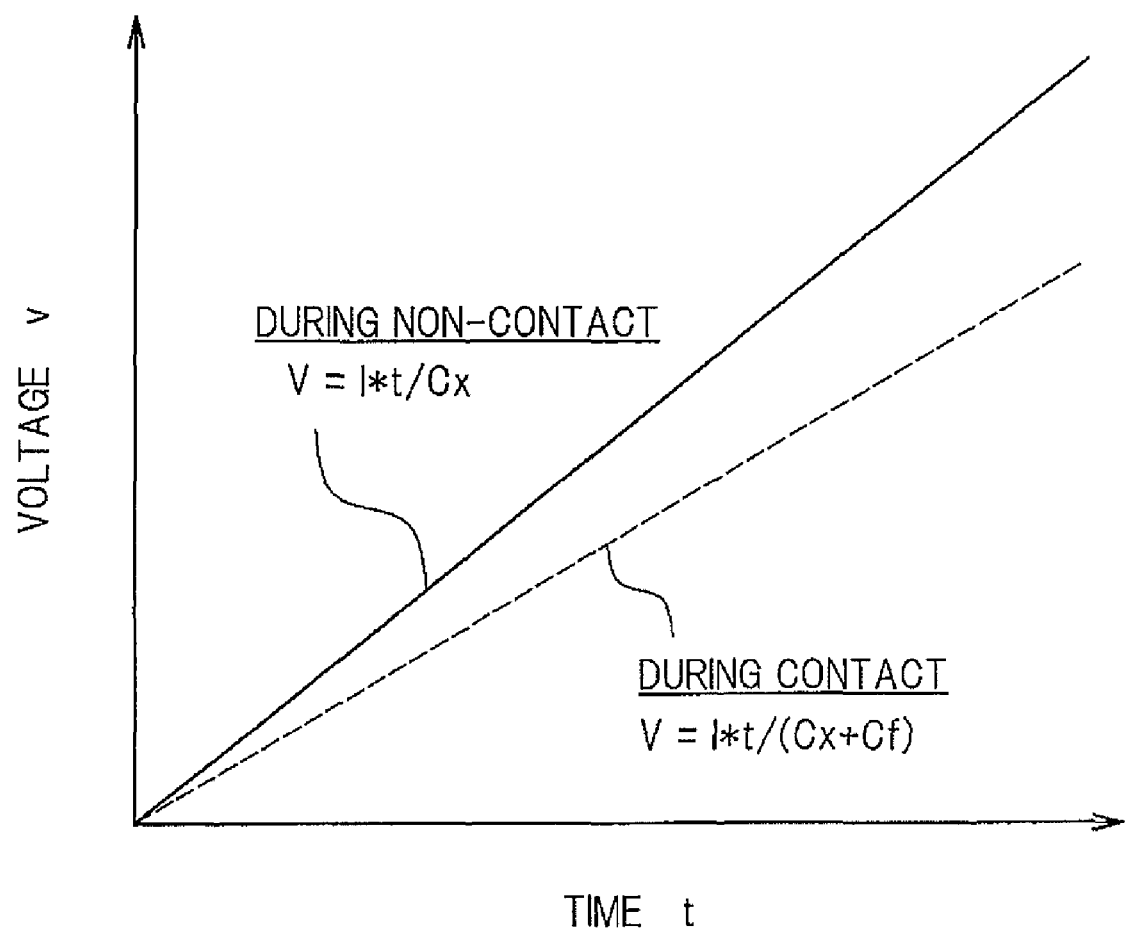
FIG. 2 is a graph showing a change in capacitance during contact and non-contact of a touch panel shown in FIG. 1.

FIG. 2 shows a relationship between detection time t and detection voltage V when a capacitance is detected with a constant current source which outputs a current I. A horizontal axis of the graph shown in FIG. 2 represents the detection time t and a vertical axis of the graph represents the detection voltage V. Because the capacitors of the X electrode XP and the Y electrode YP are charged with a constant current source, the slope during non-contact is 1/Cx and the slope during the contact is 1/(Cx+Cf). As is clear from FIG. 2, a difference occurs between the voltage during contact and the voltage during non-contact. If this difference is the signal components of the X electrode XP and the Y electrode XP, for example, in the X electrode XP, the signal component is $I \times t \times Cf/\{Cx \times (Cx+Cf)\}$, and is in an inversely proportional relation to the electrode capacitance Cx. This means that, by reducing the electrode capacitance Cx or Cy, the signal component can be increased even with the same capacitor, and the signal-to-noise ratio can be improved.

Figure 3:
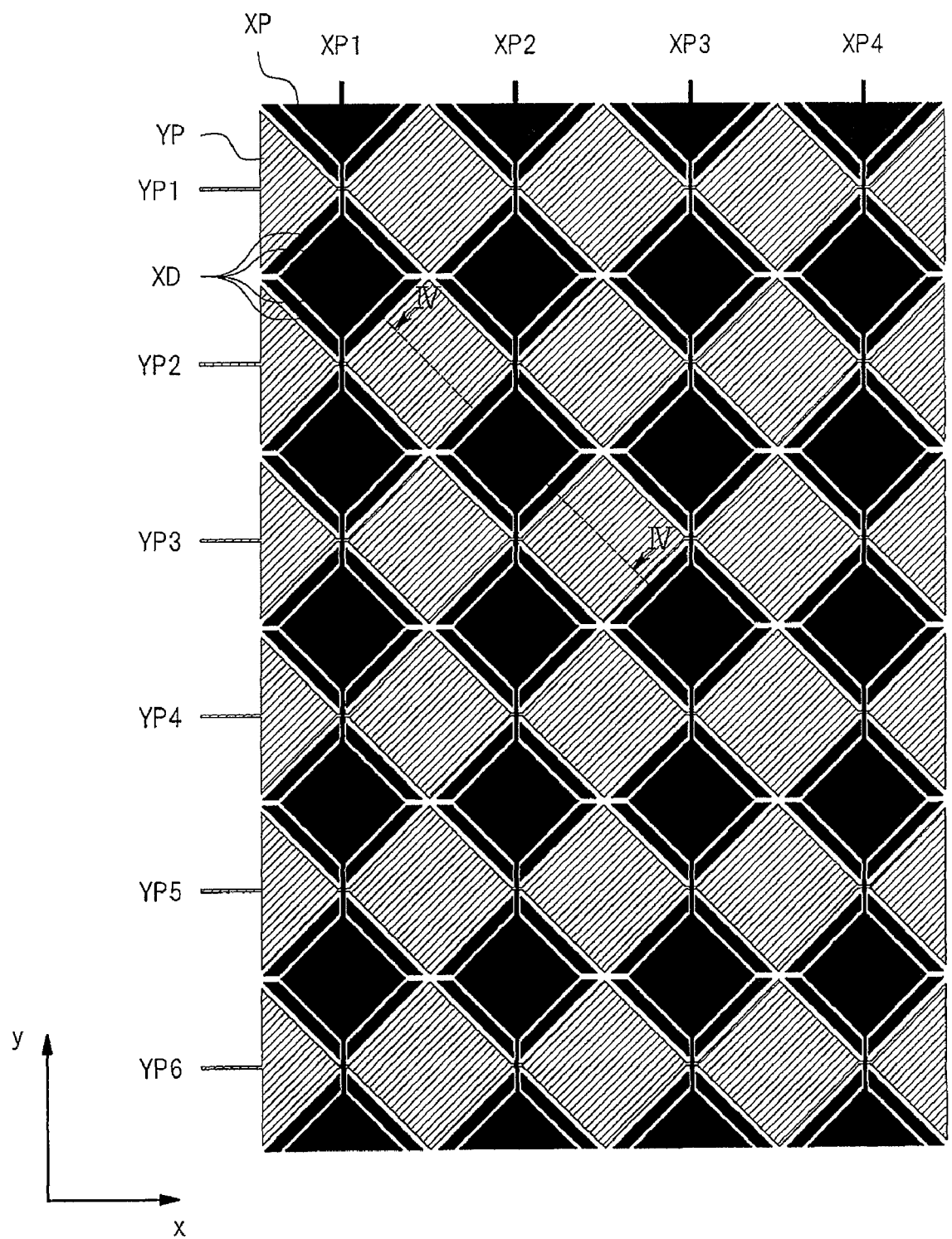
FIG. 3 is a plan view showing a preferred embodiment of the touch panel.
Figure 4A:
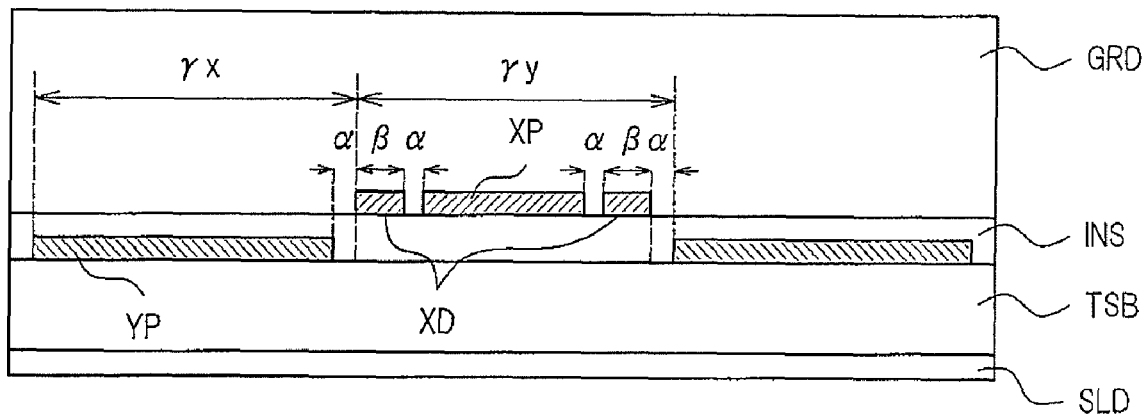
FIGS. 4A and 4B are a cross sectional view along IV-IV line of FIG. 3 and a diagram showing a capacitance generated between electrodes.

FIG. 3 is a plan view showing a preferred embodiment of the touch panel 102, and clearly shows the patterns of the X electrode XP and the Y electrode YP. FIG. 4A is a cross sectional view along a IV-IV line of FIG. 3.

As shown in FIG. 4A, in the touch panel 102, over a main surface of a transparent substrate TSB, the Y electrode YP, an insulating film INS which also covers the Y electrode YP, and the X electrode XP are sequentially formed. In addition, over an upper surface of the X electrode XP, a protection film GRD is formed also covering the X electrode XP. Over a backside of the transparent substrate TSB, a shield layer SLD for shielding against noise is formed.

The Y electrode YP comprises a transparent conductive film such as, for example, ITO (Indium Tin Oxide), and is formed extending along the x direction in FIG. 3 and aligned in the y direction. Each Y electrode YP is formed such that a wide-width portion (hereinafter also referred to as "pad portion") and a narrow-width portion (hereinafter also referred to as "narrow line portion") are alternately placed in the direction of extension. The wide-width portion has, for example, a rhombus shape in which the corner is located at connection sections at both sides with the narrow-width portion. In addition, in the other Y electrodes YP which are aligned, the wide-width direction and the narrow-width portions are placed to be aligned along the y direction.

The X electrode XP comprises a transparent conductive film such as, for example, ITO, and is formed extending along the y direction of FIG. 3 and aligned along the x direction. The X electrode XP also is formed such that a wide-width portion (hereinafter referred to as "pad portion") and a narrow-width portion (hereinafter referred to as "narrow line portion") are alternately provided along the direction of extension, and the wide-width portion has a rhombus shape in which the corner is positioned at the connection sections on both sides with the narrow-width portions. Here, as shown in FIG. 3, the wide-width portion of the X electrode XP is placed, when viewed from top, between four wide-width portions of the Y electrode YP which are adjacent to each other, surrounded by the four wide-width portions, and not overlapping the wide-width portions. Because of this, in each X electrode XP which is aligned, the wide-width portion and the narrow-width portions are placed to be aligned along the x direction in FIG. 3.

The X electrode XP and the Y electrode YP are placed such that, as shown in FIG. 3, when viewed from the top, the X electrode XP and the Y electrode YP cross each other at the narrow-width portion of the X electrode XP and the narrow-width portion of the Y electrode YP.

In addition, the wide-width portion of the X electrode XP having the rhombus shape has a structure in which, at the four sides, line-shaped electrodes (herein after referred to as "dummy electrodes XD") formed along the sides are adjacent to each other. The dummy electrode XD is provided in a floating state (insulating state) because the dummy electrode XD is formed over the insulating film INS or in the insulating film INS without electrical connections to the X electrode XP and the Y electrode YP. As will be described later in detail, these dummy electrodes XD have a function to reduce viewing of the patterns of the X electrode XP and the Y electrode YP and to increase the detection output.

Because the dummy electrode XD is provided between the pad portions of the X electrode XP and the Y electrode YP which are adjacent to each other and the side of the pad portion has a line shape, the shape of the dummy electrode XD is also a line shape. However, the side of the pad portion does not need to have a line shape, and may have a curved shape. In this case, the shape of the dummy electrode XD may have a curved shape corresponding to the shape of the sides.

As shown in FIG. 3, when viewed from the top, the dummy electrodes XD are placed between the X electrode XP and the Y electrode YP, without overlapping the X electrode XP or the Y electrode YP. That is, as shown in FIG. 4A, a distance α is provided between the X electrode XP and the dummy electrode XD and a distance α is provided between the dummy electrode XD and the Y electrode YP. In other words, the dummy electrode XD is placed in a gap between the X electrode XP and the Y electrode YP, and is formed with a distance α from the X electrode XP or the Y electrode YP. The value of the distance α is preferably not a value which changes along the periphery of the dummy electrode XD and is a constant.

Figure 4B:
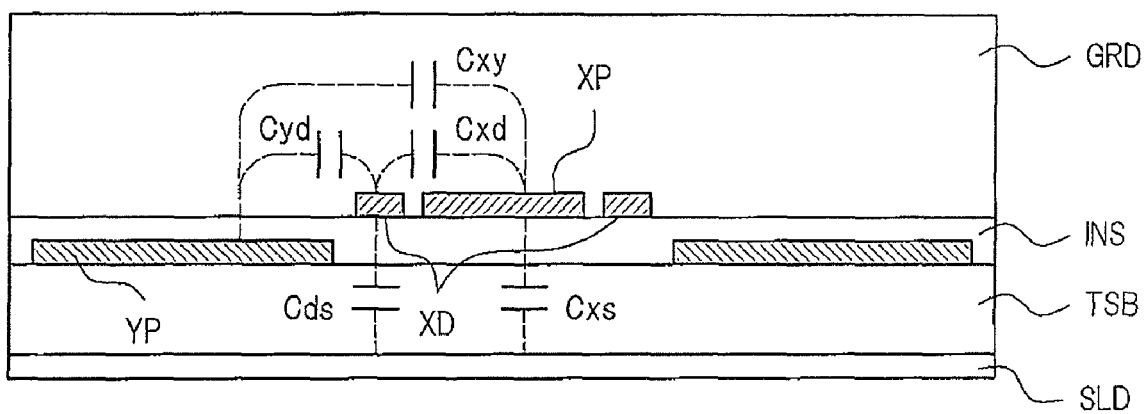

In FIGS. 4A and 4B, a width of the dummy electrode XD is shown with β, a width of the wide-width portion of the Y electrode YP is shown with γx, and a width of the wide-width portion of the X electrode XP is shown with γy including the dummy electrode XD. Here, for example, γx=γy.

In the touch panel 102 having the above-described structure, for example, the capacitance of the X electrode XP is, as shown in FIG. 4B corresponding to FIG. 4A, a sum of a capacitance Cxs between the wide-width portion of the X electrode XP and the shield layer SLD, a capacitance Cds between the dummy electrode XD and the shield layer SLD, a capacitance Cxd between the wide-width portion of the X electrode XP and the dummy electrode XD, a capacitance Cyd between the dummy electrode XD and the wide-width portion of the Y electrode YP, a capacitance Cxy between the wide-width portion of the X electrode XP and the wide-width portion of the Y electrode YP, and a crossing capacitance (not shown) between the X electrode XP and the Y electrode YP.

Figure 5:
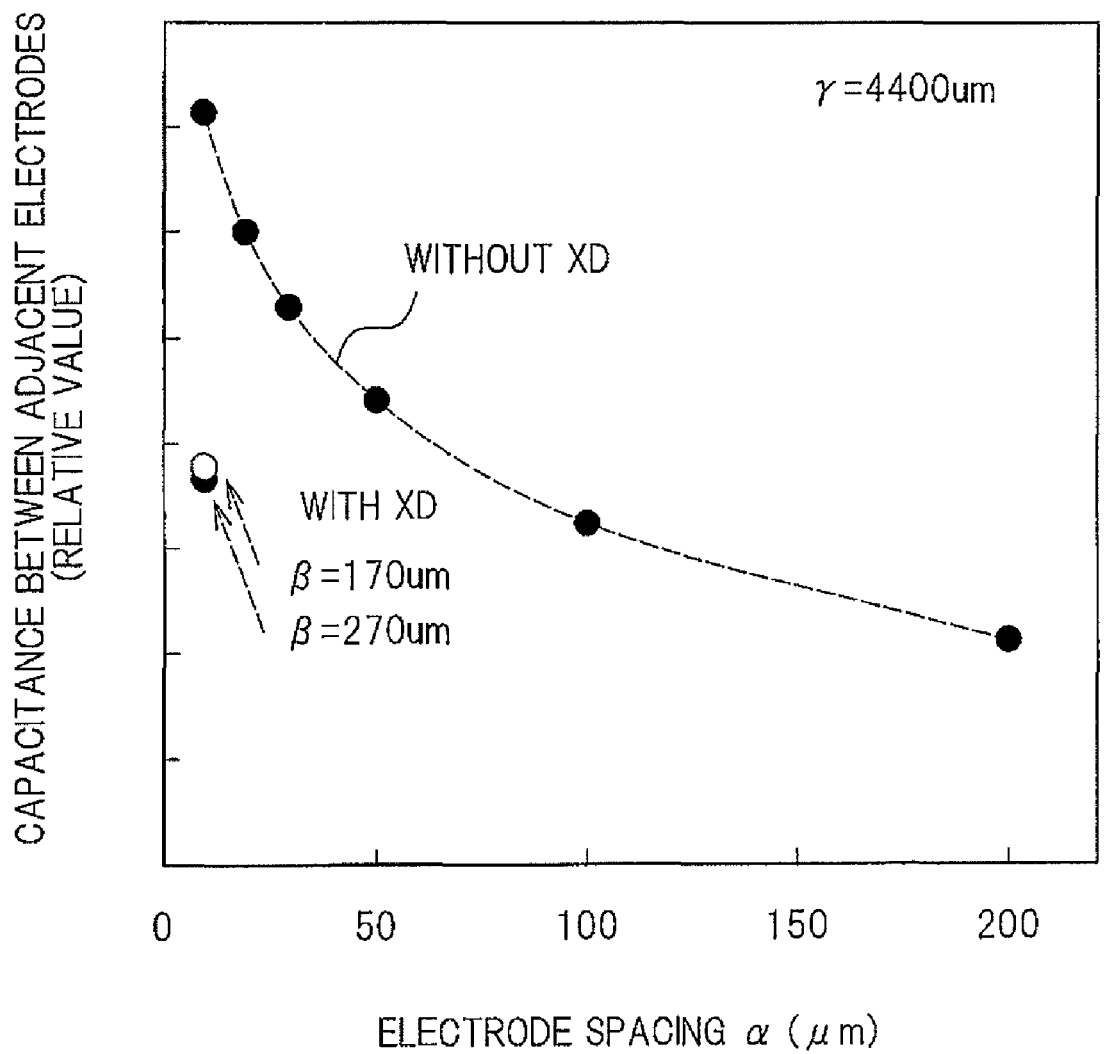
FIG. 5 is a graph showing a result of simulation of a capacitance between adjacent electrodes corresponding to cases with and without a dummy electrode.
Figure 15:
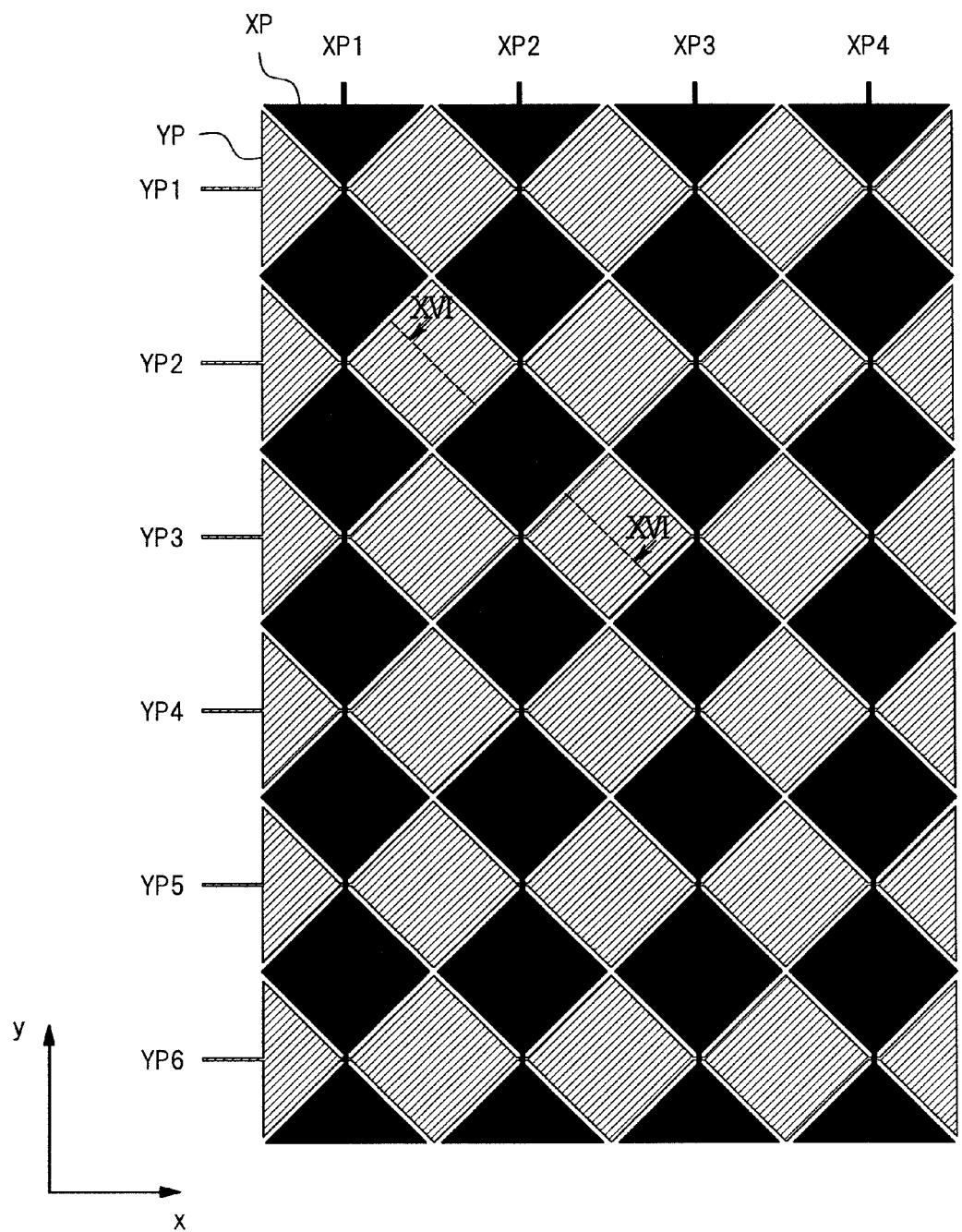
FIG. 15 is a plan view showing an example of a touch panel of related art.
Figure 16:
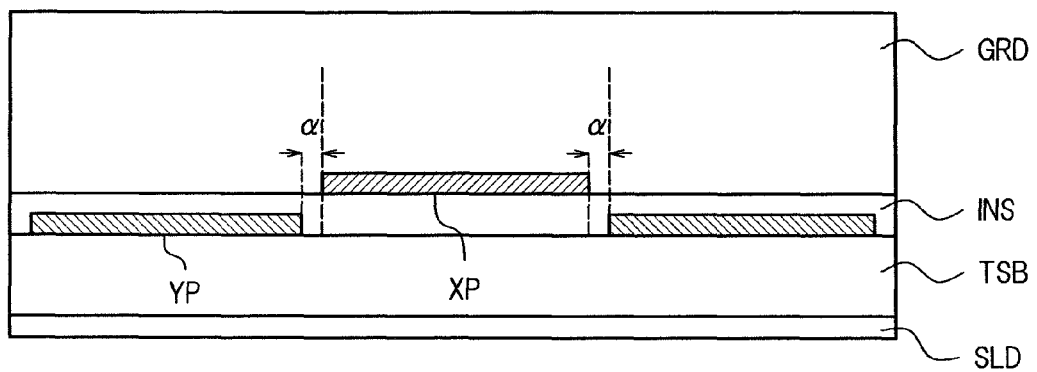
FIG. 16 is a cross sectional view along a XVI-XVI line of FIG. 15.

A graph of FIG. 5 shows a result of a simulation of a sum of the capacitances (capacitance between adjacent electrodes) shown in FIG. 4B when the width γx of the wide-width portion of the Y electrode YP and the width γy of the wide-width portion of the X electrode XP are both set to 44000 μm. It can be seen that, when the dummy electrode XD is not provided ("WITHOUT XD"; pattern shown in FIG. 15), when the distance (distance α between electrodes) between the X electrode XP (pad portion) and the Y electrode YP (pad portion) is narrowed, the capacitance is inverse-proportionally increased. It can also be seen that, when the dummy electrode XD is provided ("WITH XD"), even when the value of α shown in FIG. 4A is set to a same value as the distance α between electrodes, the capacitance can be reduced by approximately half.

Figure 6:
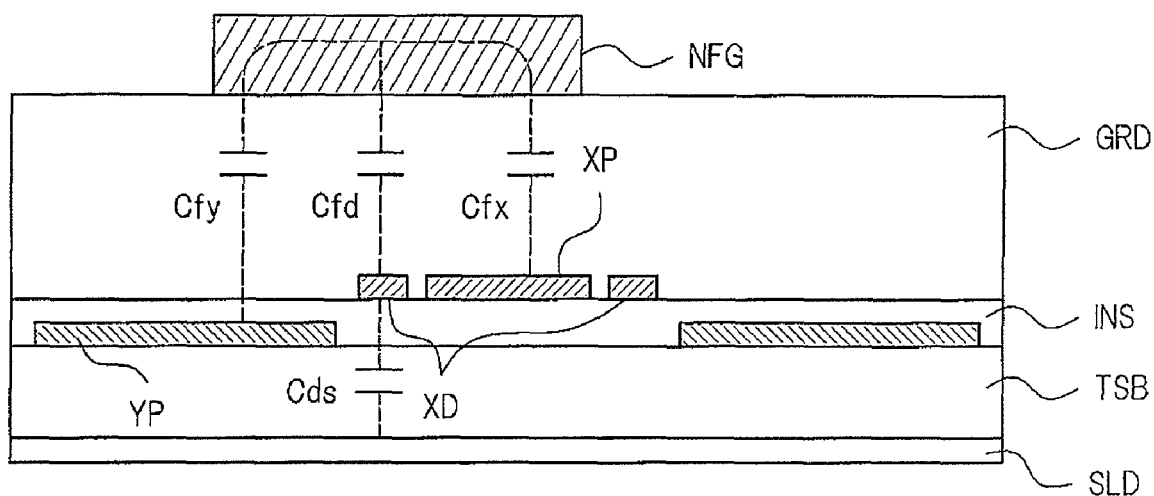
FIG. 6 is a diagram showing an amount of change of capacitance during contact of the touch panel of FIG. 1.

FIG. 6 is a diagram showing a change in capacitance when a conductor NFG formed by the finger, for example, is in contact in the structure shown in FIG. 4A. An amount of change of the capacitance is calculated by detecting, with the detection circuit 103, a total capacitance of the capacitances Cfx, Cfd, and Cfx between the conductor NFG and the electrodes. In this case, although the dummy electrode XD is in a floating state as described above, because a series capacitance of the capacitances Cds and Cfd between the shield layer SLD and the dummy electrode XD can be detected as an amount of change, the dummy electrode XD also contributes to the detection of the conductor NFG.

In the touch panel 102 having the structure as described above, by providing the dummy electrode XD, it is possible to suppress the electrode capacitance Cx to a small value in the state where the separation distance α between the pad portion of the X electrode XP and the dummy electrode XD and a separation distance α between the dummy electrode XD and the Y electrode YP are set small. Therefore, the signal component which is inversely proportional to the electrode capacitance Cx can be sufficiently obtained, and, in addition, because the dummy electrode XD also contributes to the signal detection, the detection precision of the touch panel 102 can be improved. Because of this, it is possible to reduce the separation distance α between the pad portion of the X electrode XP and the dummy electrode XD and the separation distance α between the dummy electrode XD and the Y electrode YP without considering the increase in capacitance. Thus, it is possible to make it difficult to view the patterns of the X electrode XP and the Y electrode YP.

In the above-described embodiment, the dummy electrode is formed in a same layer as the X electrode XP. However, the present invention is not limited to such a configuration, and the dummy electrode may alternatively be formed in a same layer as the Y electrode YP. Similar advantages can be obtained also with such a configuration.

Alternatively, it is also possible to form the dummy electrodes in a same layer as the X electrode XP and in a same layer as the Y electrode YP. In this case, it is desirable that the dummy electrodes XD adjacent to the X electrode XP and the dummy electrode YD adjacent to the Y electrode YP be placed such that, when viewed from the top, the dummy electrodes XD and YD do not overlap each other, are distanced, and are adjacent to each other.

In the above-described embodiment, the pad portion of the X electrode XP and the pad portion of the Y electrode YP are described as having a rhombus shape. The present invention, however, is not limited to such a configuration, and the pad portions may be of an arbitrary shape. This also applies to other embodiments to be described below.

Moreover, in the above-described embodiment, the Y electrode YP is formed over the transparent substrate TSB and the X electrode XP is formed over the insulating layer INS. However, the present invention is not limited to such a configuration, and the Y electrode YP and the X electrode XP may be switched. This applies similarly to the embodiments to be described below.

[Second Preferred Embodiment]

Figure 7:
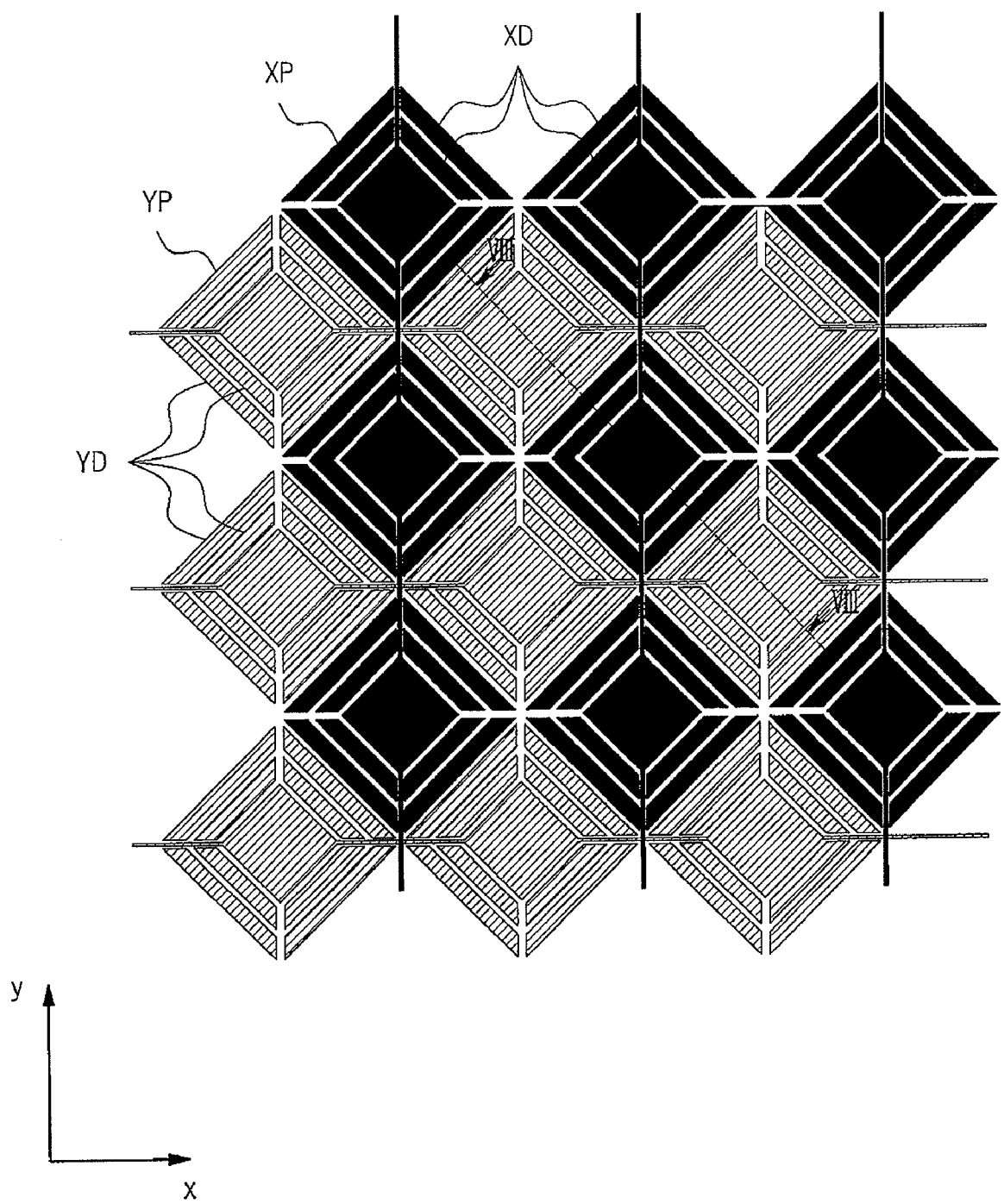
FIG. 7 is a plan view showing another preferred embodiment of the touch panel.
Figure 8:
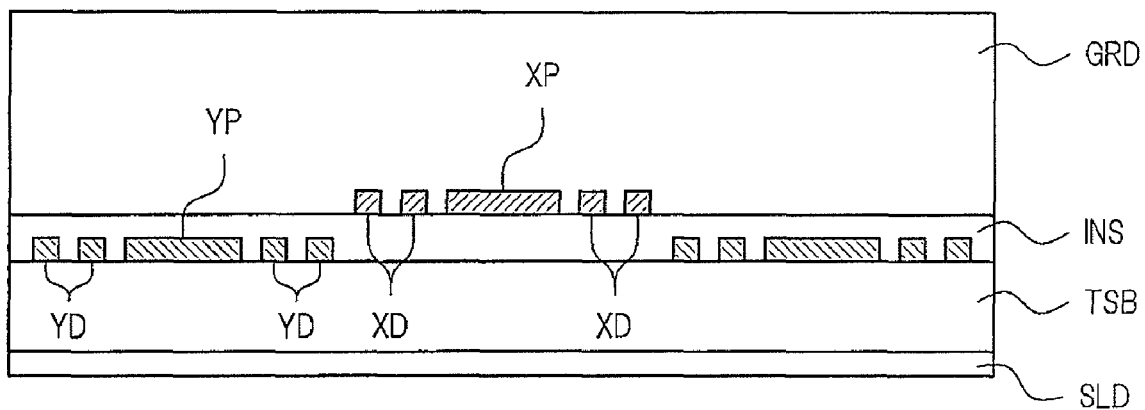
FIG. 8 is a cross sectional view along an VIII-VIII line of FIG. 7.

FIG. 7 is a plan view showing another preferred embodiment of the touch panel 102, and which corresponds to FIG. 3. FIG. 8 is a cross sectional view along an VIII-VIII line of FIG. 7.

A structure in FIG. 7 which differs from FIG. 3 is that, for the dummy electrode XD formed adjacent to each side of the pad portion of the X electrode XP, two aligned dummy electrodes CS are formed in a direction crossing each side of the pad portion. In addition, for the Y electrode YP also, the dummy electrode YD is provided adjacent to each side of the pad portion, and, for the dummy electrode YD, two aligned dummy electrodes YD are provided in a direction crossing each side of the pad portion. With such a configuration also, advantages similar to those in the first preferred embodiment can be obtained.

Alternatively, the number of dummy electrodes may be three or more. The plurality of dummy electrodes can similarly be formed in a same layer as one electrode of the X electrode XP and the Y electrode YP.

[Third Preferred Embodiment]

Figure 9:
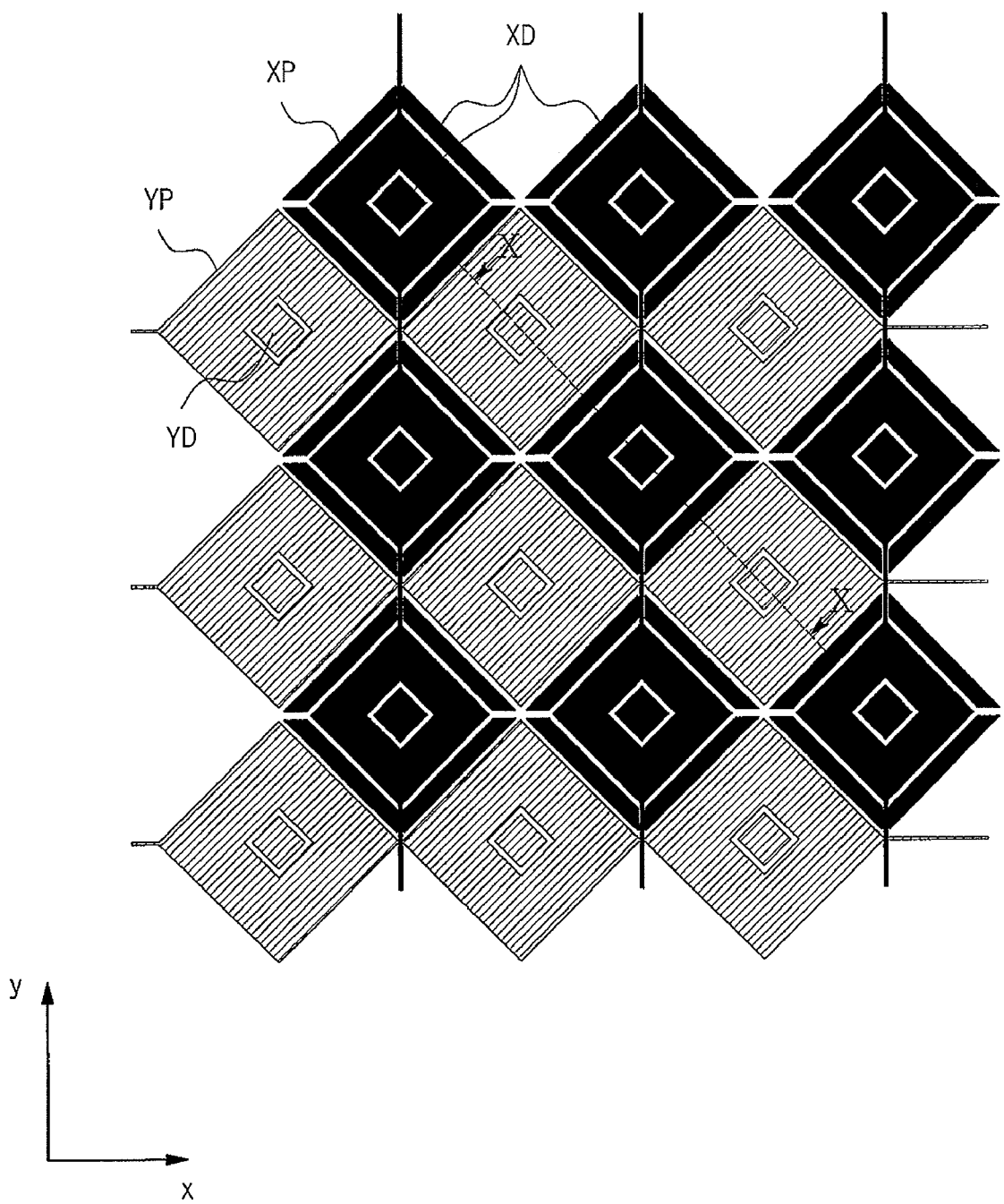
FIG. 9 is a plan view showing another preferred embodiment of the touch panel.
Figure 10:
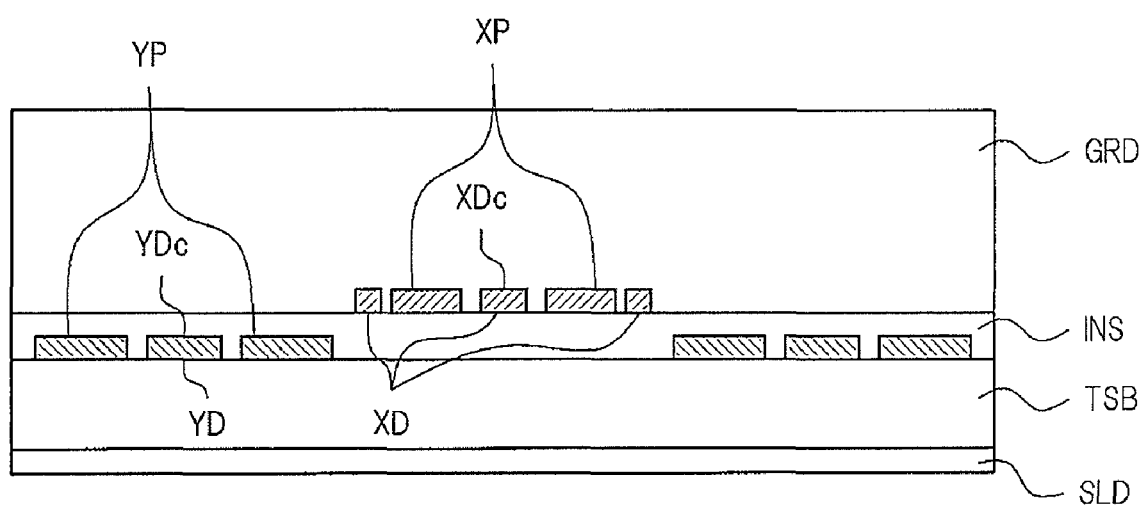
FIG. 10 is a cross sectional view along a X-X line of FIG. 9.

FIG. 9 is a plan view showing another preferred embodiment of the touch panel 102, and which corresponds to FIG. 3. FIG. 10 is a cross sectional view along a X-X line of FIG. 9.

A structure different from FIG. 3 is that a dummy electrode XD (shown with reference sign XDc in FIG. 9) in a floating state and electrically insulated from the X electrode XP is formed at a center of a pad portion of the X electrode XP and a dummy electrode YD (shown in FIG. 9 with reference sign YDc) in a floating state and electrically insulated from the Y electrode YP is formed at a center of the pad portion of the Y electrode YP.

With such a configuration, for example, at the X electrode XP, the capacitance Cxs between the shield layer SLD and the X electrode XP can be reduced. Therefore, the electrode capacitance Cx can be reduced and the signal component can be improved. In addition, when a conductor such as a finger reaches the dummy electrode XDc at the center of the pad portion of the X electrode XP, the change in the capacitance due to contact of the finger can be detected.

In the present embodiment, the dummy electrode is formed at the center of the pad portion in both the X electrode XP and the Y electrode YP. Alternatively, it is also possible to employ a configuration in which the dummy electrode is formed in one of the X electrode XP and the Y electrode YP.

The present embodiment can also be applied to the structure of the second preferred embodiment and to the structures of the fourth and later preferred embodiments.

Because the provision of the dummy electrodes XDc and YDc as described above in the region of the X electrode XP and the Y electrode YP achieves the above-described advantage by itself, alternatively, it is also possible to employ a configuration in which the dummy electrodes XD and YD are not provided between the X electrode XP and the Y electrode YP.

[Fourth Preferred Embodiment]

Figure 11:
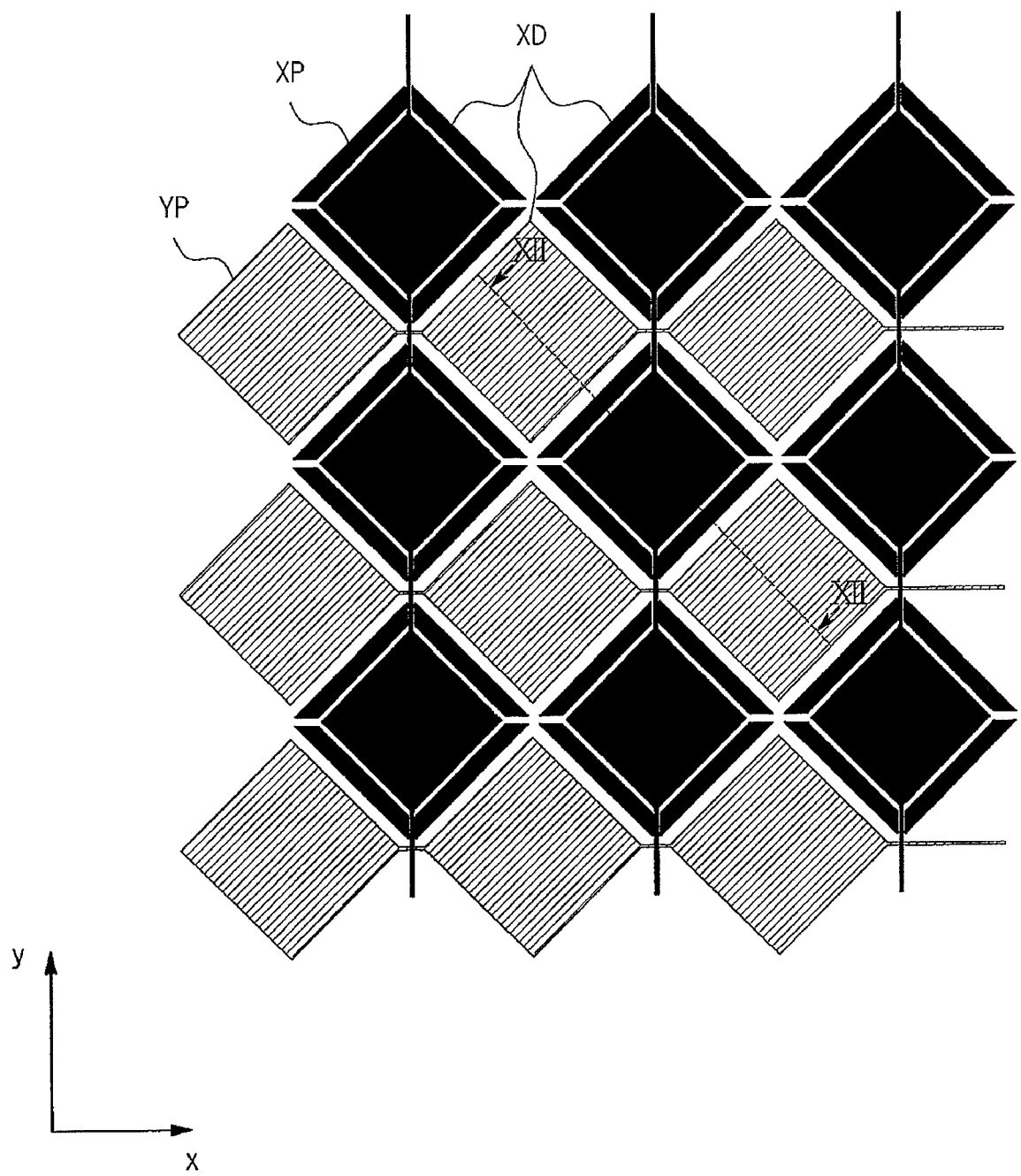
FIG. 11 is a plan view showing another preferred embodiment of the touch panel.
Figure 12:
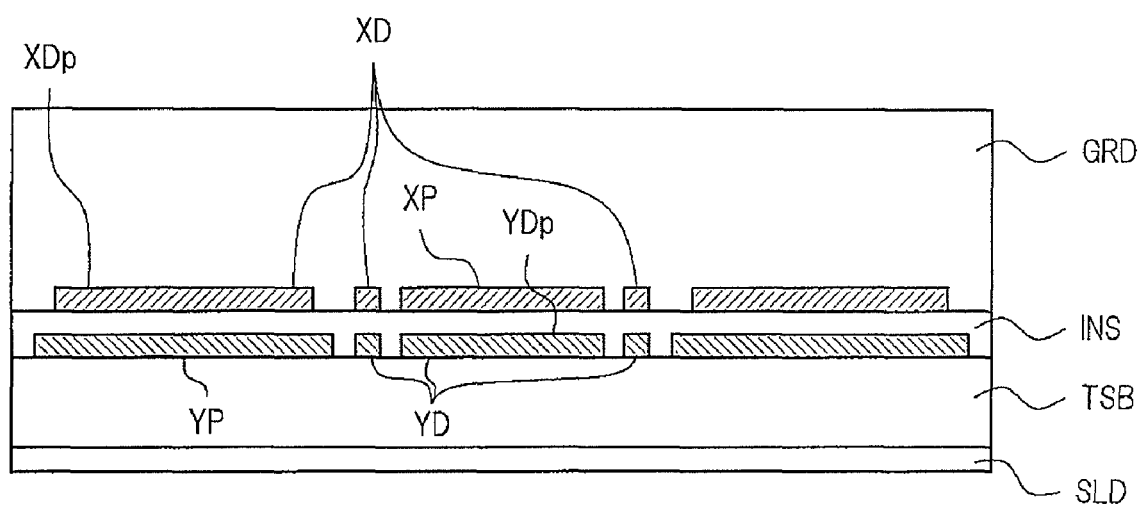
FIG. 12 is a cross sectional view along a XII-XII line of FIG. 11.

FIG. 11 is a plan view showing another preferred embodiment of the touch panel 102, and which corresponds to FIG. 3. FIG. 12 is a cross sectional view along a XII-XII line of FIG. 11.

A structure which differs from FIG. 3 is that a dummy electrode XD (shown in FIG. 11 with reference sign XDp) in a floating state having an approximately same size as the pad portion of the Y electrode YP is additionally provided in a region, in a same layer as the X electrode XP, overlapping the pad portion of the Y electrode YP. The dummy electrode YDp is a dummy electrode YDp which is separately provided external to the above-described dummy electrode YD which is formed adjacent to the pad portion of the X electrode XP. In addition, a dummy electrode YD (reference sign YDp in FIG. 11) in a floating state having a same size and same shape as the pad portion of the X electrode XP and the dummy electrode XD placed adjacent to the pad portion of the X electrode XP is provided in a same layer as the Y electrode YP overlapping the pad portion of the X electrode XP and the dummy electrode XD.

With this configuration, the pattern of the layer in which the X electrode XP is formed and the pattern of the layer in which the Y electrode YP is formed become approximately equal to each other and are overlapped with each other. This means that the optical structure can be set identical in the layers (that is, the difference in reflectance can be reduced), resulting in an advantage that it becomes more difficult to view the patterns of the X electrode XP and the Y electrode YP.

[Fifth Preferred Embodiment]

Figure 13:
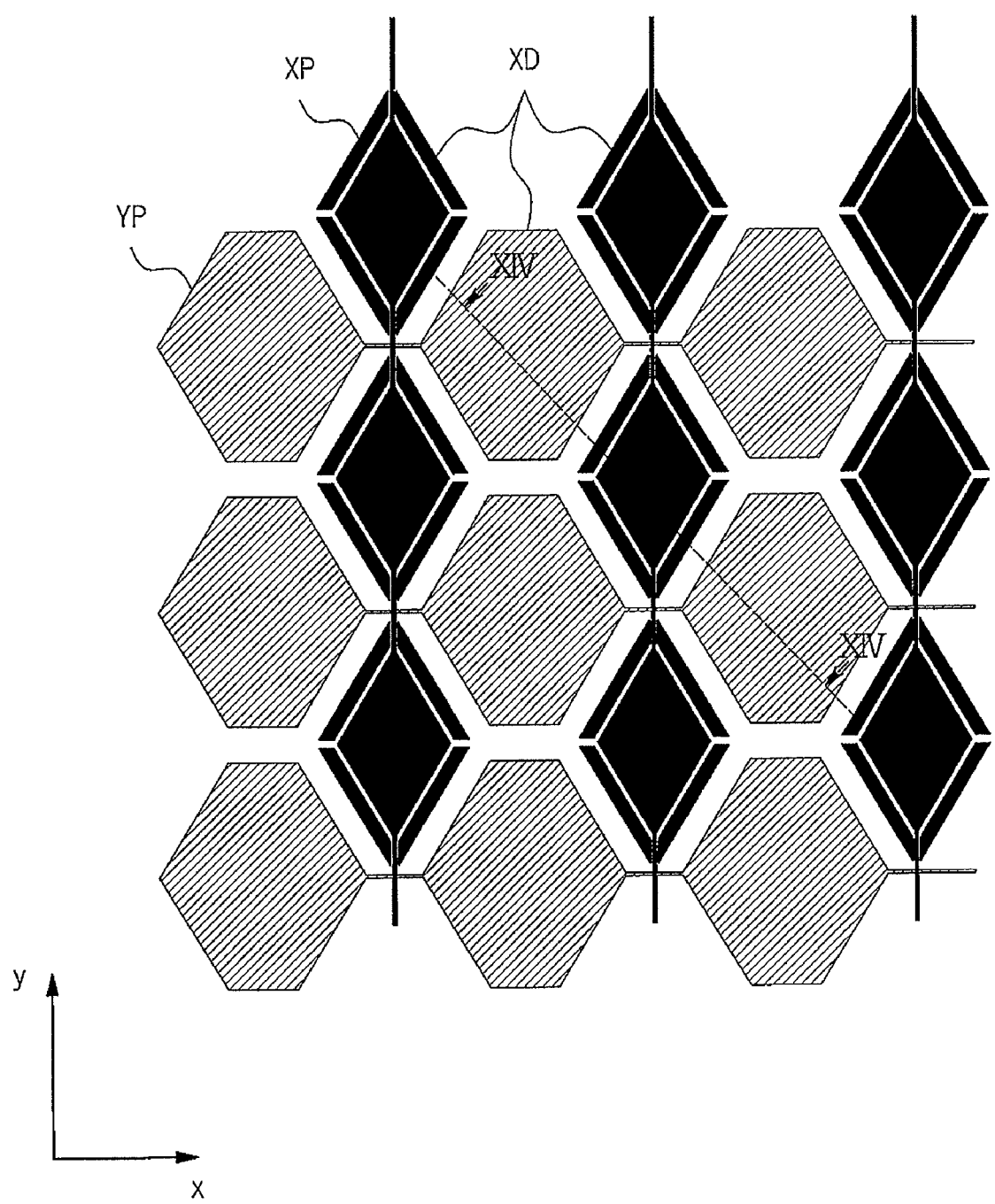
FIG. 13 is a plan view showing another preferred embodiment of the touch panel.
Figure 14:
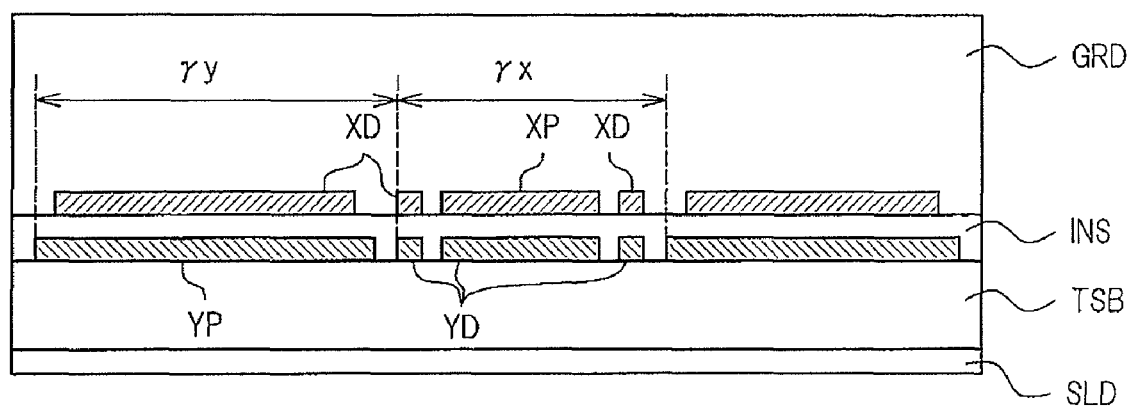
FIG. 14 is a cross sectional view along a XIV-XIV line of FIG. 13.

FIG. 13 is a plan view showing another preferred embodiment of the touch panel 102, and which corresponds to FIG. 11. FIG. 14 is a cross sectional view along a XIV-XIV line of FIG. 13.

A structure which differs from FIG. 11 is that an area of the pad portion of the X electrode XP, for example, is formed smaller than the area of the pad portion of the Y electrode YP. This is because the coordinate can be detected even when the area ratios of the pad portions of the X electrode XP and the Y electrode YP are changed.

In this case, in FIG. 13, the dummy electrode YDp is formed in a layer lower than the pad portion of the X electrode XP and having the insulating film INS therebetween in a manner to overlap the pad portion of the X electrode XP. The dummy electrode YDp has an area which is approximately equal to the area of the pad portion of the X electrode XP. In addition, the dummy electrode XDp is formed in a layer above the pad portion of the Y electrode YP with the insulating film INS therebetween in a manner to overlap the pad portion of the Y electrode YP. The dummy electrode XDp has an area which is approximately equal to the area of the pad portion of the Y electrode YP.

The fifth preferred embodiment assumes the structure of the fourth preferred embodiment, with the area ratios of the pad portions of the X electrode XP and the Y electrode YP changed. However, the present invention is not limited to such a configuration, and the area ratios of the pad portions of the X electrode XP and the Y electrode YP can be changed assuming the structure of any one of the first through third preferred embodiments.

In addition, in the fifth preferred embodiment, the area of the pad portion of the X electrode XP is set smaller than the area of the pad portion of the Y electrode YP. However, the present invention is not limited to such a configuration, and, alternatively, it is also possible to employ a configuration in which the area of the pad portion of the Y electrode YP is set smaller than the area of the pad portion of the X electrode XP.

In the first through fifth preferred embodiments, when a plurality of dummy electrodes are provided between the pad portion of the X electrode XP and the pad portion of the Y electrode YP, when viewed from the top, the dummy electrodes are aligned in a direction from the pad portion of the X electrode XP to the pad portion of the Y electrode YP. The present invention, however, is not limited to such a configuration, and the dummy electrodes may be aligned in a direction perpendicular to this direction.

The present invention has been described with reference to preferred embodiments. The structures shown in the preferred embodiments, however, are merely exemplary, and various modifications can be made within a scope of the present invention. In addition, the structures described in the preferred embodiments may be combined as long as the combination is not contradictory.

What is claimed is:

1. A display panel having a capacitive touch panel over a display region, the capacitive touch panel comprising:
   a plurality of X electrodes and a plurality of Y electrodes formed with an insulating layer therebetween and in a manner to cross each other, each of the X electrodes and the Y electrodes being formed to have a pad portion and a narrow line portion alternately placed in a direction of extension, the pad portion of each of the X electrodes and the pad portion of each of the Y electrodes being placed not to overlap each other when viewed from top; and
   a dummy electrode which is in a floating relationship with the X electrodes and the Y electrodes, the dummy electrode being formed between the pad portion of each of the X electrodes and the pad portion of each of the Y electrodes without overlapping the X electrodes and the Y electrodes.

2. The display panel according to claim 1, wherein the dummy electrode comprises a plurality of electrodes which are aligned in a direction from the pad portion of each of the X electrodes to the pad portion of each of the Y electrodes.

3. The display panel according to claim 1, wherein the dummy electrode is formed in a same layer as the X electrodes.

4. The display panel according to claim 1, wherein the dummy electrode is formed in a same layer as the Y electrodes.

5. The display panel according to claim 2, wherein the dummy electrode comprises a dummy electrode formed in a same layer as the X electrodes and a dummy electrode formed in a same layer as the Y electrodes.

6. A display panel having a capacitive touch panel over a display region, the capacitive touch panel comprising:
   a plurality of X electrodes and a plurality of Y electrodes formed with an insulating layer therebetween and in a manner to cross each other, each of the X electrodes and the Y electrodes being formed to have a pad portion and a narrow line portion alternately placed in a direction of extension, and a dummy electrode which is in a floating relationship with the X electrodes and the Y electrodes, the dummy electrode being formed one of (a) in each of regions surrounded by the pad portion of each of the X electrodes and the Y electrodes and (b) between the pad portion of each of the X electrodes and the pad portion of each of the Y electrodes, and the dummy electrode being formed in the one of (a) and (b) without overlapping the X electrodes and the Y electrodes.

7. The display panel according to claim 6, wherein the dummy electrode is formed as (a) in each of regions surrounded by the pad portion of each of the X electrodes and the Y electrodes.

8. The display panel according to claim 7, wherein when viewed from top, the pad portion of each of the X electrodes and the pad portion of each of the Y electrodes are placed not to overlap each other, further comprising a second dummy electrode which is in a floating relationship, the second dummy electrode being formed between the pad portion of each of the X electrodes and the pad portion of each of the Y electrodes.

9. The display panel according to claim 8, wherein the second dummy electrode between the pad portion of each of the X electrodes and the pad portion of each of the Y electrodes comprises a plurality of electrodes which are aligned in a direction from the pad portion of each of the X electrodes to the pad portion of each of the Y electrodes.

10. The display panel according to claim 8, wherein the second dummy electrode is formed in a same layer as the X electrodes.

11. The display panel according to claim 8, wherein the second dummy electrode is formed in a same layer as the Y electrodes.

12. The display panel according to claim 8, wherein the second dummy electrode comprises a second dummy electrode formed in a same layer as the X electrodes and a second dummy electrode formed in a same layer as the Y electrodes.

* * * * *